United States Patent [19]
Urlik et al.

[11] Patent Number: 5,226,609
[45] Date of Patent: Jul. 13, 1993

[54] MOTION PICTURE FILM SHIPPING AND HANDLING MEANS

[76] Inventors: Randall G. Urlik, 7990 S. Clayton St.; Peter T. Quinn, 7319 S. Lafayette Cir. West, both of Littleton, Colo. 80122

[21] Appl. No.: 715,684

[22] Filed: Jun. 14, 1991

Related U.S. Application Data

[63] Continuation-in-part of Ser. No. 641,298, Apr. 30, 1991, Pat. No. 5,174,516, which is a continuation-in-part of Ser. No. 584,793, Sep. 19, 1990, Pat. No. 5,174,517.

[51] Int. Cl.⁵ .................................. B65H 16/04
[52] U.S. Cl. .................. 242/55.18; 242/71.8; 206/398; 206/406
[58] Field of Search ......... 242/55.18, 55.99 R, 242/55.19 A, 71.8, 77, 77.3, 77.4, 115, 116, 118.4, 118.6, 118.8, 71, 71.1, 71.7, 71.8, 71.9; 352/126, 128; 206/398, 402, 404, 406, 408

[56] References Cited

U.S. PATENT DOCUMENTS

| | | | |
|---|---|---|---|
| 1,371,786 | 3/1921 | Hummel et al | 206/402 |
| 1,823,245 | 9/1931 | Wittel | 242/55.18 |
| 1,871,235 | 8/1932 | Proctor et al. | 242/71.1 |
| 2,273,274 | 2/1942 | Krause | 242/71.1 |
| 2,327,108 | 8/1943 | Heyer | 242/55.19 A |
| 2,475,036 | 7/1949 | Lopez-Henriquez | 242/55.18 |
| 2,546,146 | 3/1951 | Popoli | 242/55.18 |
| 2,703,684 | 3/1955 | Warfield | 242/72 R |
| 2,846,219 | 8/1958 | Matheson | 242/55.18 |
| 3,340,997 | 9/1967 | McCreery et al. | 206/404 |
| 3,343,666 | 9/1967 | Mathus | 206/406 |
| 3,353,660 | 11/1967 | Will | 206/406 |
| 3,357,546 | 12/1967 | Mathus | 206/406 |
| 3,369,653 | 2/1968 | Edwards | 206/406 |
| 3,369,654 | 2/1968 | Burgess | 206/406 |
| 3,468,491 | 9/1969 | Barry et al. | 242/71.1 |
| 3,489,273 | 1/1970 | McKelvey | 206/406 |
| 3,780,959 | 12/1973 | Burth | 242/55.18 |
| 3,823,890 | 7/1974 | Potts | 242/55.18 |
| 3,883,087 | 5/1975 | Van Praag | 242/71.8 |
| 3,993,260 | 11/1976 | Bauer, Sr. | 242/55.18 |
| 4,010,910 | 3/1977 | Boudouris et al. | 242/55.18 |
| 4,030,675 | 6/1977 | Eissfeldt | 242/55.18 |
| 4,124,172 | 11/1978 | Verch | 206/398 X |
| 4,169,566 | 10/1979 | Boudouris et al. | 242/55.18 |
| 4,240,593 | 12/1980 | Bell et al. | 242/71.8 |
| 4,629,140 | 12/1986 | LaCasse | 242/71.8 |
| 4,676,370 | 6/1987 | Rudick | 206/404 X |
| 4,744,528 | 5/1988 | Winters | 242/71.8 |
| 4,754,878 | 7/1988 | Bose | 206/398 |
| 4,949,912 | 8/1990 | Bose et al. | 242/55.18 X |

Primary Examiner—Daniel P. Stodola
Assistant Examiner—John P. Darling
Attorney, Agent, or Firm—Terry M. Gernstein

[57] ABSTRACT

A motion picture film shipping and handling case unit is adapted to be used in conjunction with a motion picture film that is supported on a flange, or which is supported only on a hub, including a hub unit such as disclosed in these two patent applications. The case unit includes a strap surrounding the outer perimeter of the unit, a plurality of straps connected to a handle and locks. The locks include a lap joint on the case unit and a special case lock attached to the case unit.

26 Claims, 7 Drawing Sheets

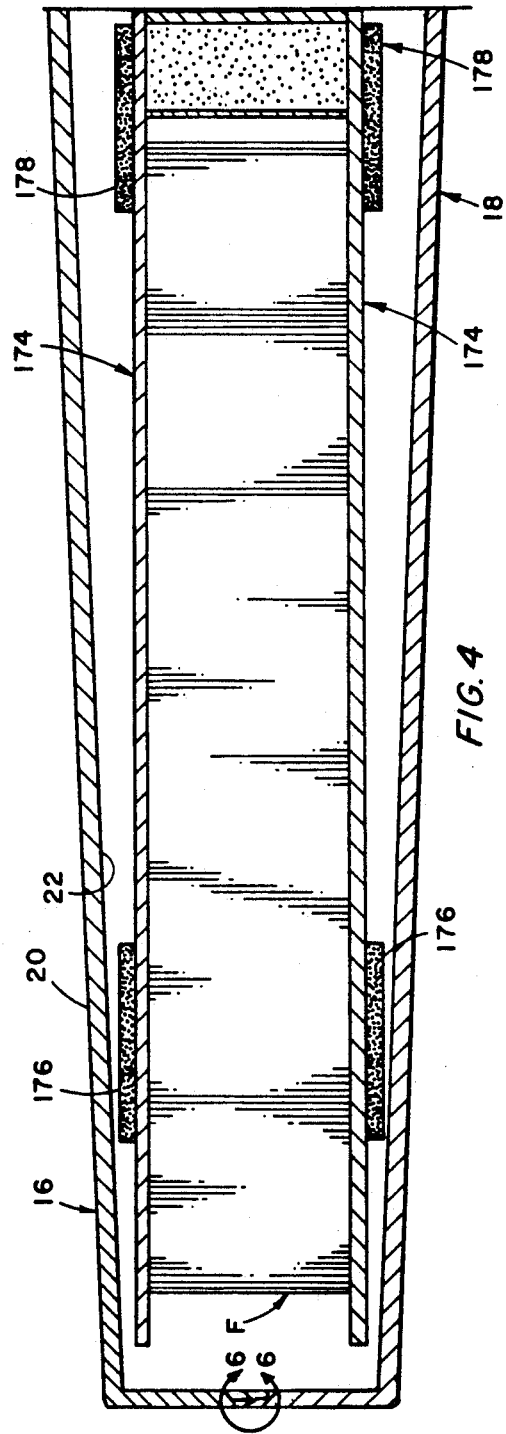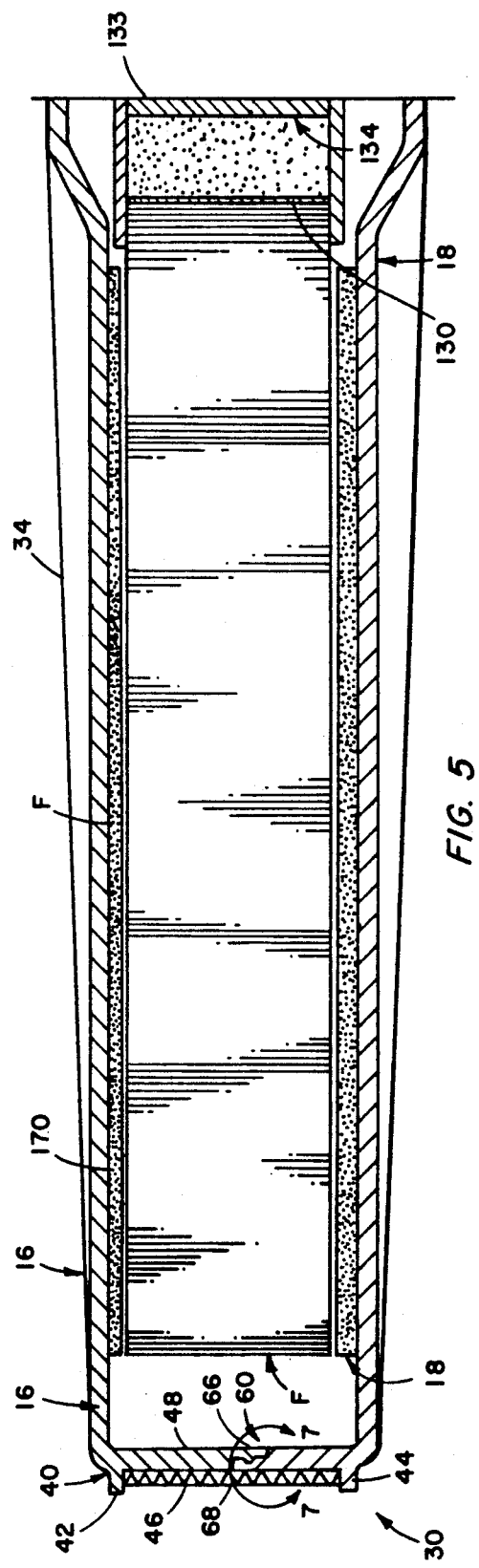

MOTION PICTURE FILM SHIPPING AND HANDLING MEANS

The present application is a continuation-in-part of patent application U.S. Ser. No. 07/641,298, filed on Apr. 30, 1991 (hereinafter referred to as the parent application), now U.S. Pat. No. 5,174,516, which was a continuation-in-part of patent application Ser. No. 07/584,793, filed on Sept. 19, 1990 (hereinafter referred to as the grandparent application, now U.S. Pat. No. 5,174,517. The disclosures of each of these applications are incorporated herein by reference.

TECHNICAL FIELD OF THE INVENTION

The present invention relates to the general art of winding and reeling, and to the particular field of motion picture film handling systems.

BACKGROUND OF THE INVENTION

Modern movie films are generally manufactured in one location and shipped to various distributors located throughout the world. These distributors then move the films to various theaters with whom they are associated. This distribution system has been in place for many years, and has worked well.

However, recent changes in movie film formats as well as theater format have placed a strain on this system. For example, modern films can be in a variety of formats and can be any length including 12,000 feet or longer. Such movie films can weigh 40 or more pounds, and can be easily damaged by improper handling. Heretofore, many producers have shipped a film in multiple segments that are spliced together after receipt to form a single film. Prior to returning, the film must be broken down to its original form. Splicing associated with this shipping method has damaged films, shortened films, deleted frames, and the like.

Still further, many modern theaters are complexes of a plurality of individual movie theaters. Several movies may be run in these complexes, and one feature film also may be shown in several theaters of one complex. This can create several problems. For example, moving a heavy film from one place to another may subject that film and its supporting elements to physical abuse or damage. The film supporting system also can be damaged in this process. Such damage may delay the showing of the film to permit repairing the film or to permit repairing or replacing the handling system. Sometimes, damage to, or loss of, one element of the handling system requires replacing the entire handling system. This can cause extra expense and aggravation for an exhibitor.

The motion picture film shipping and handling means disclosed in the parent and grandparent patent applications referred to above are amenable to use with films of all lengths, including full length feature films, and protect the film and the film handling system from damage. These film shipping and handling means also make handling of a motion picture film easier than prior means.

While effective, even these film shipping and handling means can be improved.

Specifically, since the weight of a feature length motion picture film can be so great, further improvement in a film shipping and handling means can be made by making such means lighter and easier to handle. Still further improvement can be achieved by making the shipping and handling means more versatile. This increased versatility can be obtained by making the shipping and handling means amenable to use with films stored on a flange or films that are not on such a flange.

Still further improvement can be achieved by ensuring that a closed shipping container is easy to handle and, once closed, will remain closed in a secure manner. This will ensure that the film will remain in the closed container during shipping and handling.

Therefore, there is a need for further improvement in the motion picture film shipping and handling means disclosed in the parent and grandparent patent applications.

OBJECTS OF THE INVENTION

It is a main object of the present invention is to further improve the motion picture film shipping and handling means disclosed in the parent and in the grandparent patent applications.

It is another object of the present invention to provide a motion picture film shipping and handling means that is light in weight, yet is secure in its storage and protection of motion picture films stored therein.

It is another object of the present invention to provide a motion picture film shipping and handling means that is versatile enough to contain and securely protect a motion picture film stored therein on a flange or stored therein without a flange.

It is another object of the present invention to provide a motion picture film shipping and handling means that is easy to carry.

It is another object of the present invention to provide a motion picture film shipping and handling means that is amenable to use in conjunction with the hubs and flanges disclosed in the parent and grandparent applications.

SUMMARY OF THE INVENTION

These, and other, objects are achieved by a motion picture film shipping and handling means case unit that can securely contain a full length motion picture film that has been stored on a flange system, such as disclosed in the parent and/or the grandparent patent applications, or that is contained in the case unit without any flange unit. The case unit has means for securely closing that case unit and maintaining that case unit closed during shipping and handling. In fact, the case unit of the present invention includes means for securely locking the case unit closed.

In this manner, the overall weight of the system, including a film and the case unit, can be reduced from prior systems since the flange element associated with the film can be eliminated. However, even though the weight of the present system is reduced as compared to prior carrying cases, the case unit of the present invention includes means for ensuring that the container, once closed, will remain closed.

Still further, the container system of the present invention also includes a handle unit that not only contributes to the secure closing of the container, but makes handling of the container easy.

BRIEF DESCRIPTION OF THE DRAWING FIGURES

FIG. 4 is a partial elevational view of one portion of the container in conjunction with flange supported film.

FIG. 5 is a partial elevational view of one portion of the container in conjunction with film that is not supported on a flange.

DETAILED DESCRIPTION OF THE PREFERRED EMBODIMENT OF THE INVENTION

Figure 2:
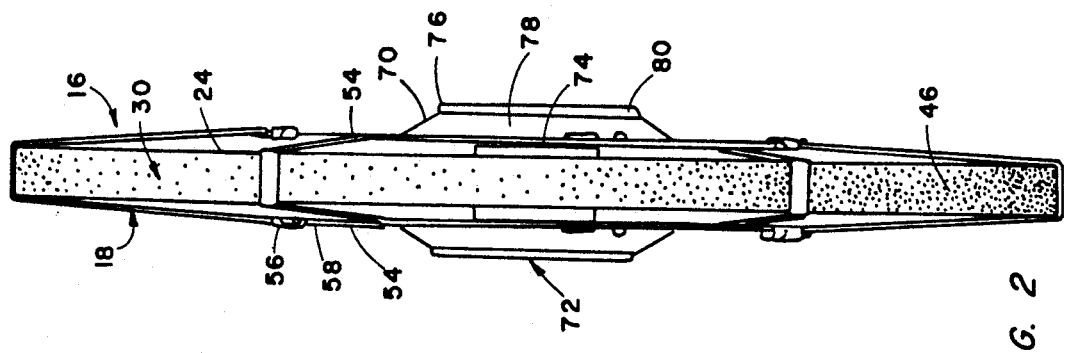
FIG. 2 is a typical elevational view thereof, all end elevational views being similar to the view shown in FIG. 2.

Shown in FIGS. 1, 2, 3 and 4 is a case unit 10 embodying the present invention. The case unit 10 is shown as being circular in peripheral shape, and having an outer perimeter 12 and a central area 14 located near the center of the circular shape. The case unit is hollow and includes two identical portions, a first portion 16 and a second portion 18 that are releasably joined together to define a container for film. The portions can be formed from a single mold. The film container thus formed is amenable to storing film that is mounted either on a flange in a manner such as disclosed in the parent or the grandparent applications, or film that is merely mounted on a hub unit similar to the hub unit disclosed in the parent and/or grandparent patent applications.

The case unit 10 is lighter than prior cases, yet is secure and once closed, will remain closed. When closed, each portion of the case unit includes an inner surface 22 and an outer surface 24. Motion picture film F is contained in the case unit in a manner that will be understood from the ensuing discussion. The film will be retained in position by a motion picture film engaging means located on the inner surfaces of the case portions. Still further, the case unit will be retained closed by a case closing means 30 surrounding the outer perimeter of the closed case, and a case locking means that includes a padlock 32 located in the center area A of the case unit. Further closing insurance is provided by case closing means that includes strap means and further bolts that will be discussed below. The strap means includes a plurality of flexible straps, such as strap 34, each of which extends radially with respect to the case unit. A carrying case handle unit 36 is releasably attached to the case unit near the center area A by fasteners, such as bolts 37. Each of these broad units will be discussed in greater detail below. All of these units co-operate to provide a securely closed case unit that can be lighter than other case units yet will be quite versatile in that motion picture film mounted on a flange can be accommodated, while also accommodating motion picture film that is not on a flange.

Specifically referring to FIGS. 2 and 5, the case closing means 30 includes a channel-like configuration 40 formed on the outer perimeter of the case unit by two parallel flanges 42 and 44, each of which is located on one of the case unit portions 16 and 18 respectively. The flanges are each located near the outer surface of the case unit portion to define the channel-like configuration 40 when the case portions are coupled together as indicated in FIG. 5. A strap element 46 extends circumferentially around the outer perimeter of the case unit and is releasably coupled to that unit. This strap preferably includes a strap mounting means, such as a hook-and-loop means 48, for releasably attaching the strap to the case unit.

Figure 1:
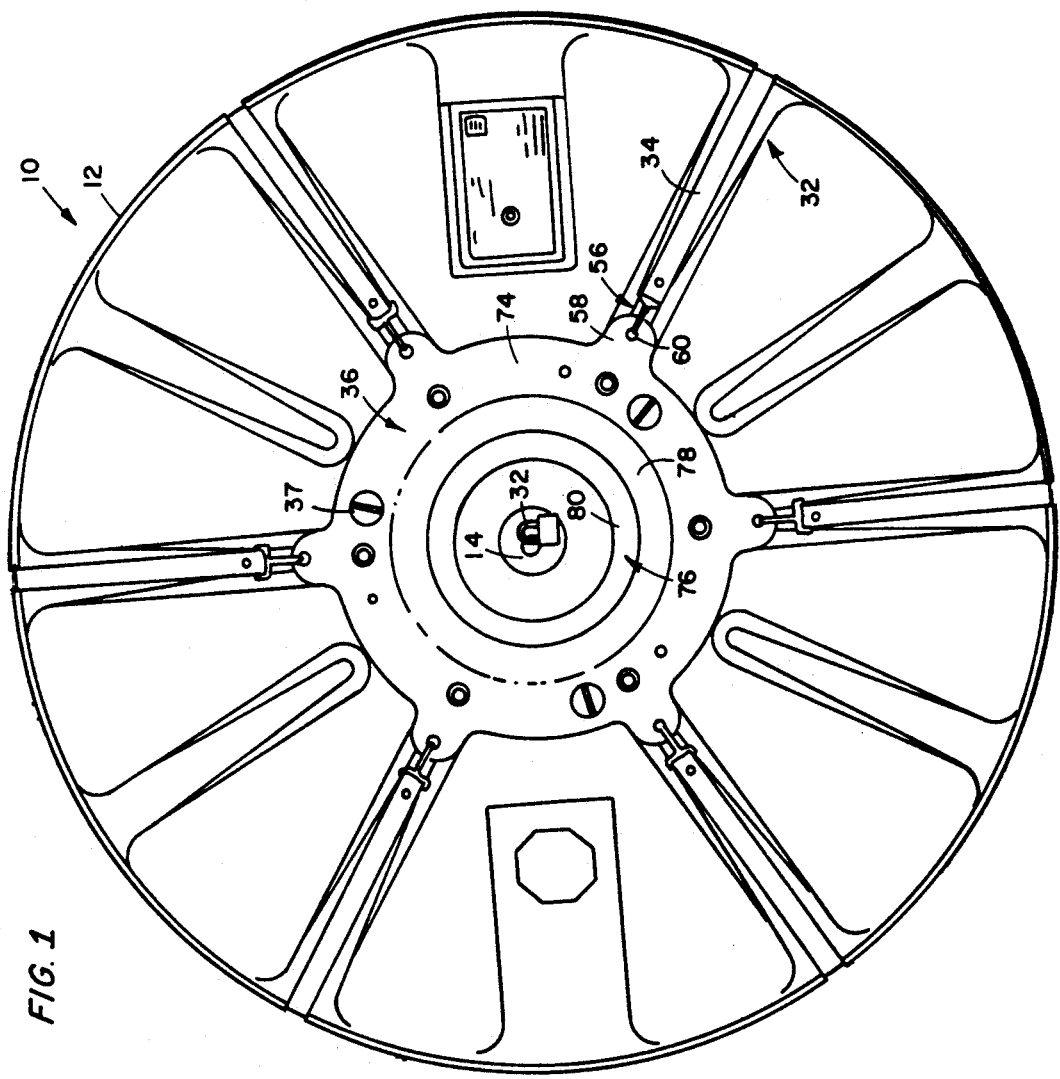
FIG. 1 illustrates a container unit embodying the present invention, the rear being a mirror image of the front shown in FIG. 1 with the exception of the shipping and source labels.
Figure 3:
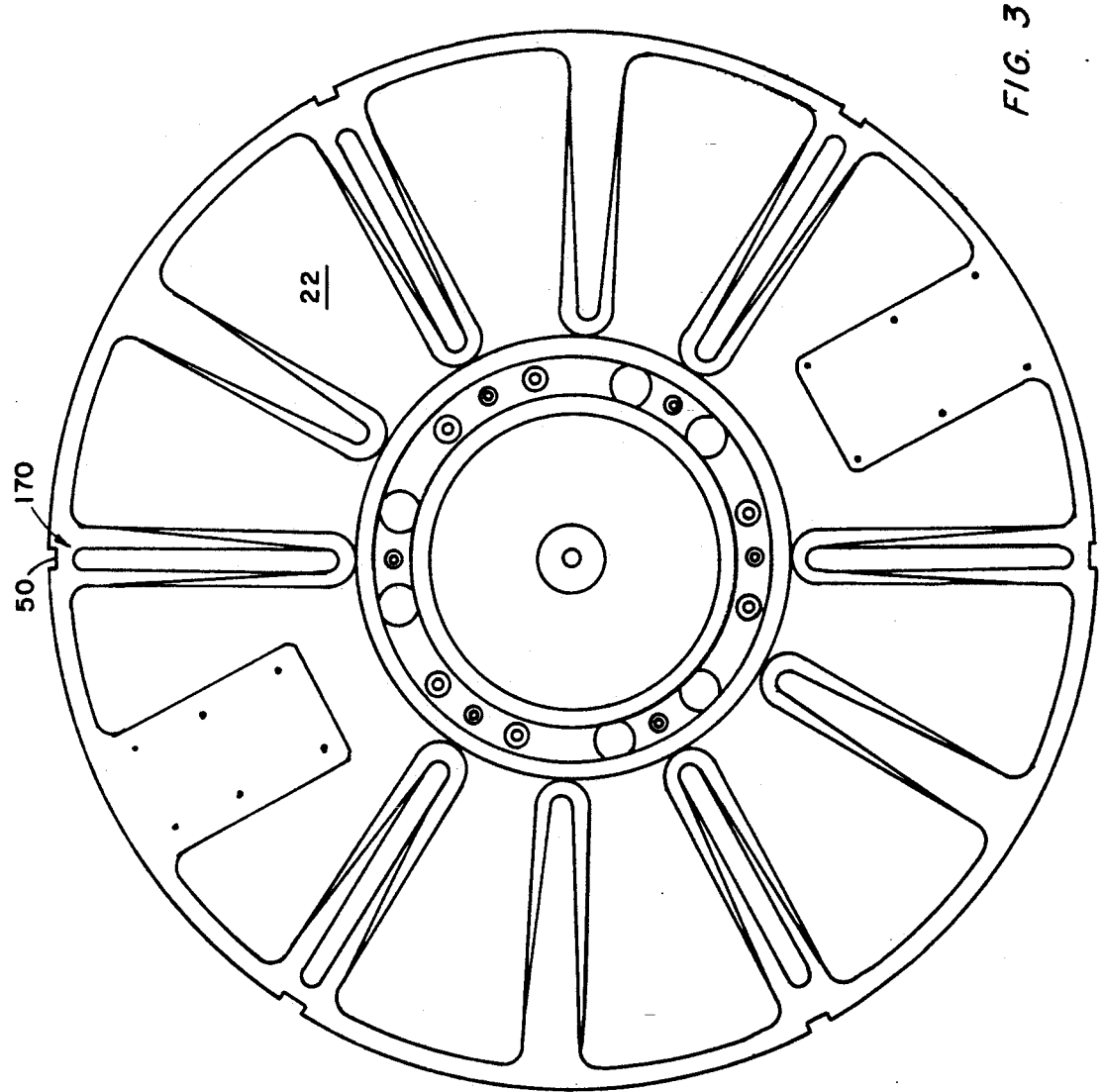
FIG. 3 is an elevational view of the inside surface of the container unit.

As is also shown in FIGS. 1, 2 and 3, the case closing means further includes a plurality of indentations, such as indentation 50, defined in the case unit portions. The indentations are each defined in each case unit portion to align with an indentation on the other case portion when the case unit portions are connected together to form the case unit. The aligned indentations form guide paths for the straps 34 and ensure that those straps will remain in place during shipping and handling. The indentations will be covered by the circumferential strap 46 as is indicated in FIG. 2.

Each strap is connected at each end 52 and 54 to the handle unit 36 adjacent to case unit portions 16 and 18 respectively by releasable buckles, such as buckle 56. The handle includes a plurality of ears, such as ear 58 to which the buckles are attached via holes 60 in the ears. The straps extend over the circumferential strap 46 and add further security to the case unit.

The case unit closing means further includes a lap joint 60 shown in FIGS. 4-7. The lap joint includes a locking bead 62 on one portion of the case unit and a co-operating locking dimple 64 on the other portion of the case unit. The locking bead and the dimple are located on overlapping stepped surfaces 66 and 68 respectively. The bead and the dimple interlock to couple one case unit portion to the other. In the preferred form of the device, the two case portions are identical for expediting the manufacturing process. Therefore, each case portion contains both dimples and beads. For example, the circumference of the case portion is divided into a plurality of arcuately spaced apart sections. Adjacent sections alternately contain a bead and a dimple whereby a bead has dimples on each side thereof and a dimple has beads on each side thereof.

Figure 8:
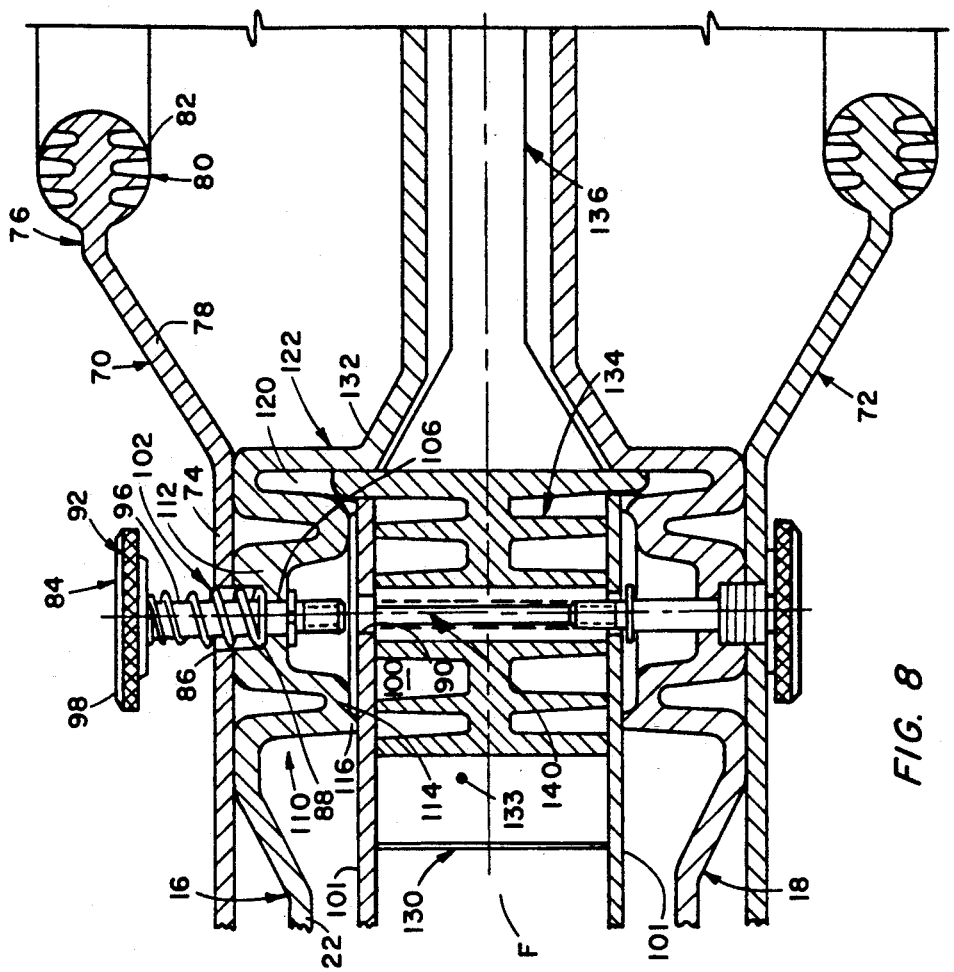
FIG. 8 is a partial elevational view of a case carrying handle unit mounted on a case unit of the present invention.
Figure 6:
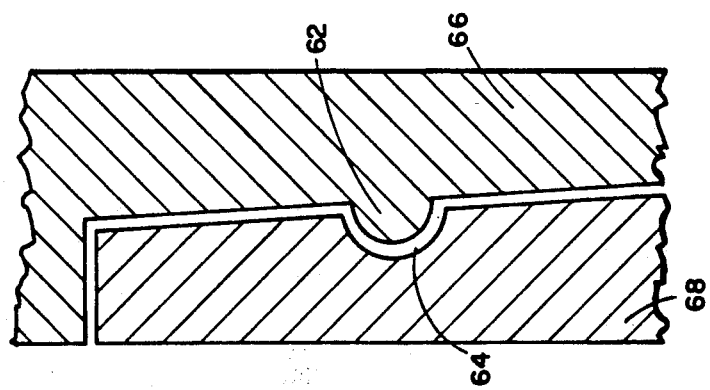
FIG. 6 is a blow up of section 6—6 indicated on FIG. 4 illustrating a lap joint for releasably locking one portion of the FIG. 4 case unit to another portion of that case unit.
Figure 7:
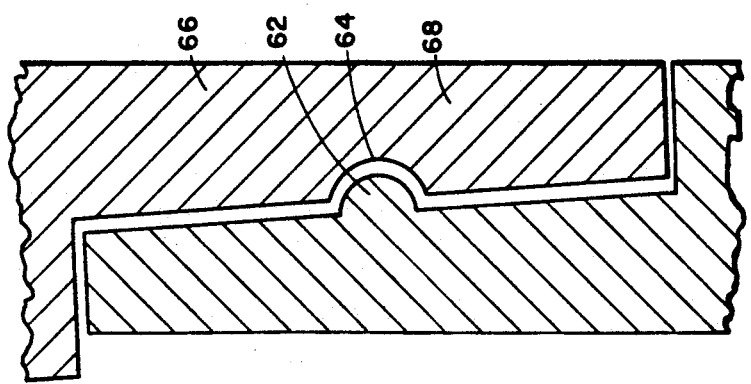
FIG. 7 is a blow up of section 7—7 indicated on FIG. 5 illustrating a lap joint for releasably locking one portion of the FIG. 5 case unit to another portion of that case unit.

As is best indicated in FIGS. 1, 2 and 8, the handle unit 36 includes two identical portions 70 and 72 mounted on case portions 16 and 18 respectively. Since both portions of the handle unit are identical, only one portion will be described. Referring specifically to FIG. 8, it will be seen that handle portion 70 includes a planar section 74 connected to a peripheral section 76 by a wall section 78. The section 74 is attached to a case unit portion outer surface, and the wall section extends away from the case outer surface, with the peripheral section 76 being spaced from the case outer surface. The planar section surrounds the peripheral section 76. The peripheral section includes an annular rim 80 which is engaged by a user's hand. The wall section 78 forms a conical area, and the user inserts their hand into that conical area and grasps the rim 80. The rim 80 includes a plurality of ribs, such as rib 82, that can compress to make carrying the case unit easier and more comfortable for the user.

As indicated in FIGS. 1 and 8, each portion of the handle unit is releasably attached to the case portions and to the hub unit by a handle locking means that includes a plurality of locks 84. The locks 84 include the above-discussed bolts 37. The locks 84 are all identical and each includes a bore 86 defined through the handle planar section 74 and a bore 88 defined through the case portion adjacent thereto. If a flange is used to mount the film, that flange also has a bore 90 defined therethrough. When in place, all of these bores are aligned as indicated in FIG. 8. A locking pin 92 is received in the aligned bores to lock the handle unit and the case portions to the flange and to each other.

The locking pin 92 includes a body 96 having a head 98 on one end thereof and a cam 100 near the other end thereof. The cam engages the inner surface 22 of the case portion in one position of the locking pin, and is located adjacent to the outer surface 101 of the film supporting flange in a second position of the locking pin. In either position, the locking pin will attach the handle unit to the case unit, and in the second position, the pin distal end fits through the film supporting flange bore to attach the case unit to the flange. If suitable, another form of the handle locking means will include the bore through the case portion being oblong or oval in shape so the cam will fit through the bore when it is oriented with respect to such oblong bore in a first orientation, and will engage the case portion adjacent to the oblong bore when the cam is in a second orientation. By orienting the cams with respect to the oblong bores, the locking pin can be moved through the bores to release the handle unit from the case portion and then, by re-orienting the cams with respect to the bores, the handle unit can be locked to the case portion. A spring 102 surrounds the body portion of each locking pin and engages the head 98 and a spring seat 106 on the case unit portion adjacent thereto. The spring urges the locking pin out of the bores as indicated in FIG. 8.

As can also be seen in FIG. 8, the case unit portions include U-shaped sections 110 adjacent to the case locking screws. These U-shaped sections 110 include a central section 112 connected to the case unit portion by web sections 114. The bore 88 and the spring seat 106 are located in the central section 112, and an annular flange 116 surrounds the web sections. The flange 116 rests on the film supporting flange, and a U-shaped slot 120 is defined between the flange 116 and a section 122 of the case unit portion.

A hub unit, such as disclosed in the parent or in the grandparent patent applications is located in the case unit. The hub unit includes a film winding ring 130 on which the film is mounted, a flange portion 132 of that hub unit is received in the slot 120 to securely lock and align the hub unit to the case unit. The hub unit further includes a packing ring 133 interposed between the film winding ring 130 and a shipping ring 134. The packing ring 133 is formed of flexible closed cell material such as polyethylene or the like. The hub unit further includes a removable center hub portion 136 as is discussed in the prior applications. The film F is wound around the film winding ring 130. The hub unit is more fully discussed in such applications. A case locking screw receiving bore 140 is defined in the hub unit whereby the distal end of the locking pin is accommodated in the bore 140 to lock the case to the hub unit.

Figure 9:
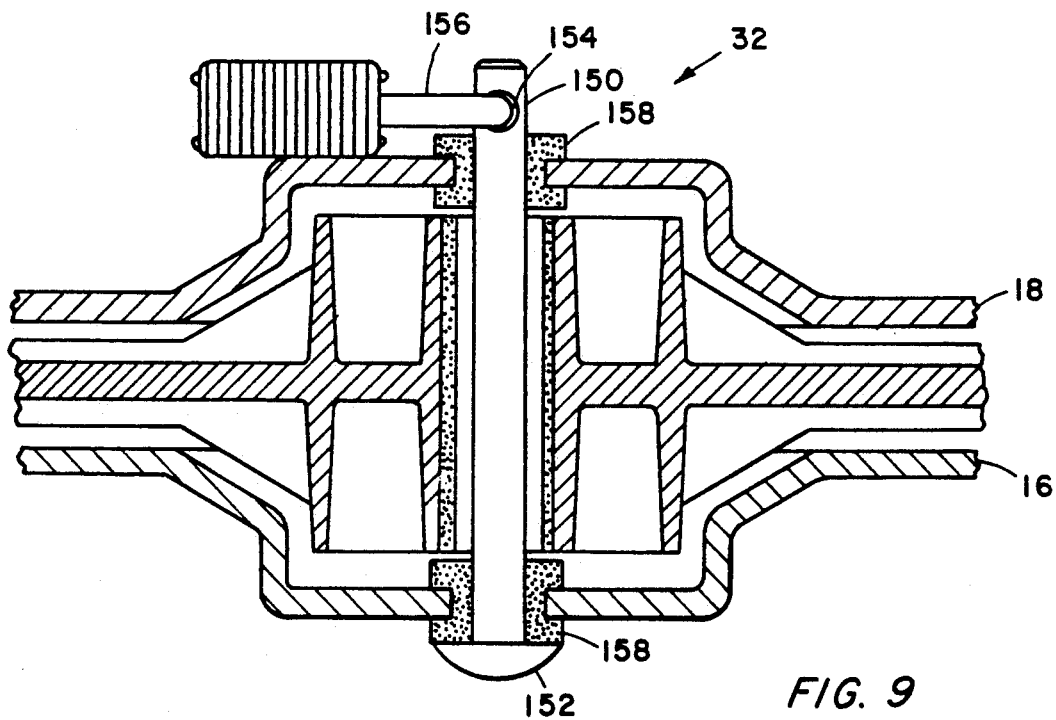
FIG. 9 is a partially cutaway elevational view of a case locking means.
Figure 10:
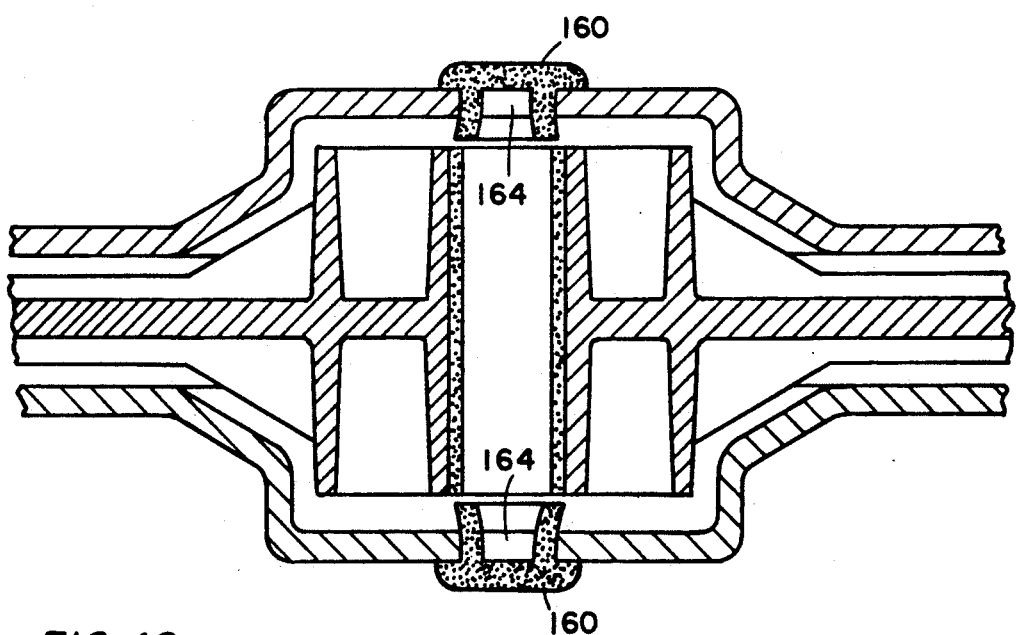
FIG. 10 is a partially cutaway elevational view of a center area of the case unit of the present invention with the locking means removed.
Figure 11:
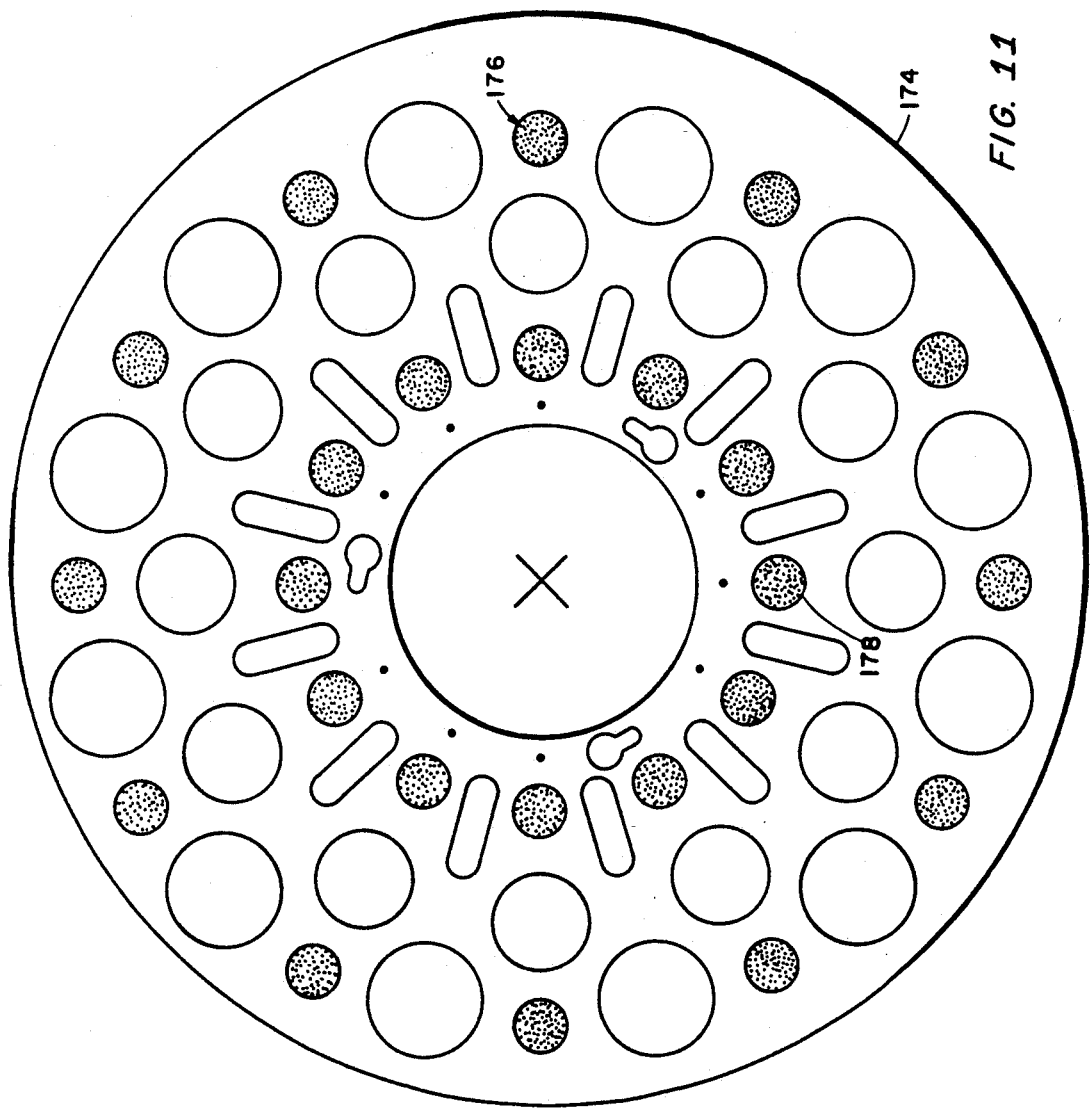
FIG. 11 illustrates a flange for supporting a film, such as the flange indicated in FIG. 4.

The further case locking means 32 is best shown in FIGS. 9 and 10 as including a locking pin 150 having a case-engaging head 152 on one end thereof and a lock element receiving bore 154 on the other end thereof. A lock element 156, such as a padlock, engages the pin 150. As shown in FIG. 9, the locking pin extends through the central portion of the hub unit and through bushings 158 mounted on the case portions. In the event that locking pin 150 is not being used, two closure plugs 160 are inserted through bores 164 in place of the bushings 158.

As shown in FIGS. 3, 4, 5 and 11, the film is further secured in the case unit by a film-engaging means. The filmengaging means includes a plurality of flexible ribs 170 mounted on the case portion inner surface 22 and extending radially of that surface. The ribs can be formed of an elastomer or the like, and will engage the film or the flange on which the film is supported. The ribs are angularly spaced apart from each other, and engage the film or the film-supporting flange as indicated in FIG. 5. A film supporting flange 174 includes a plurality of bumper elements, such as pad 176 and 178. The pads 176 are angularly spaced apart as are the pads 178. The pads 176 and 178 are located so as to be interposed between adjacent ribs 170. The ribs and the pads co-operate to securely hold the film in place in the case unit or to securely hold the film-supporting flange in place in the case unit.

Figure 12:
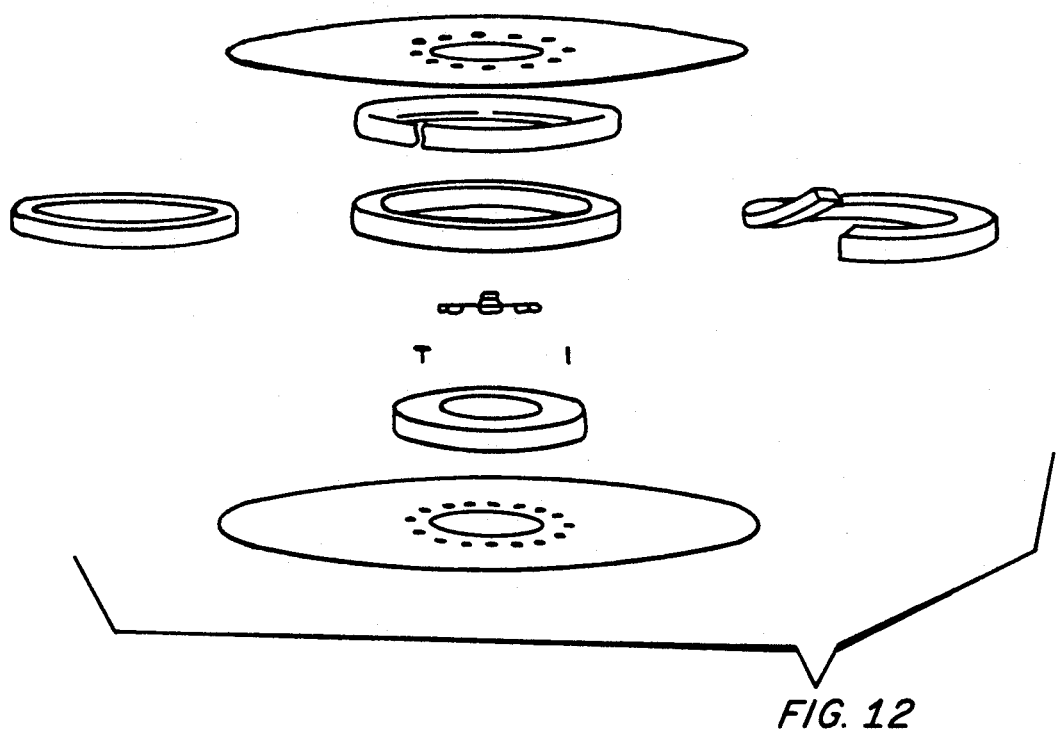
FIG. 12 is an exploded perspective view of the reel portion of a film shipping and handling unit disclosed in the parent application.
Figure 13:
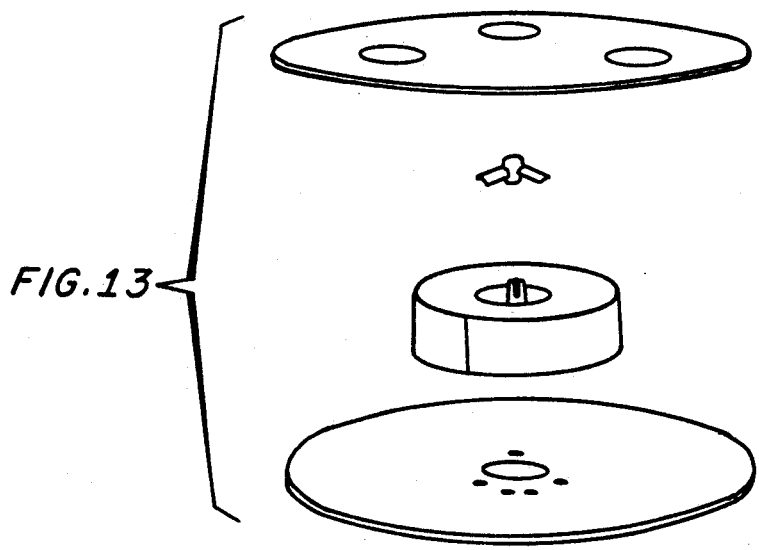
FIG. 13 is is an exploded perspective view of the reel portion of a film shipping and handling unit disclosed in the grandparent application.

Referring to FIGS. 12 and 13, two shipping and handling means that can be used in conjunction with the case unit of the present invention are shown. These means correspond to the means disclosed in the parent and in the grandparent patent applications respectively. The details of these means are fully disclosed in these patent applications, and reference is made to such applications for such details.

It is understood that while certain forms of the present invention have been illustrated and described herein, it is not to be limited to the specific forms or arrangements of parts described and shown.

We claim:

1. A motion picture film shipping and handling unit comprising:
   (A) a case unit for containing a motion picture film and which includes an outer surface and an inner surface, a center area and an outer perimeter;
   (B) means on said case inner surface for holding motion picture film in place in said case unit;
   (C) a plurality of indentations defined in said case outer surface along said outer perimeter;
   (D) a case closing means on said outer perimeter; and
   (E) a case carrying handle unit attached to said case at said case unit center section and including two hand-engaging elements, each hand-engaging element having a planar section, a peripheral section and a wall section connecting said peripheral section to said planar section.

2. The motion picture film shipping and handling unit defined in claim 1 wherein said means for holding motion picture film in place includes a plurality of flexible strips mounted at spaced-apart locations on said case unit inner surface.

3. The motion picture film shipping and handling unit defined in claim 2 wherein said case closing means further includes a plurality of radial straps each connected to said case unit carrying handle unit and being located in one of said indentations.

4. The motion picture film shipping and handling unit defined in claim 2 wherein said case closing means further includes a lap joint in said case outer perimeter, said lap joint including a locking bead on one portion of said case and a locking dimple on another portion of said case unit, said locking bead being located in said locking dimple when said case unit is fully closed.

5. The motion picture film shipping and handling unit defined in claim 2 wherein said case closing means includes a circumferential strap surrounding said case outer perimeter.

6. The motion picture film shipping and handling unit defined in claim 5 wherein said case closing means further includes two spaced-apart flanges on said case near said case unit outer perimeter with said circumferential strap being located between said flanges.

7. The motion picture film shipping and handling unit defined in claim 5 wherein said case closing means further includes strap mounting means on said case outer perimeter for releasably attaching said circumferential strap to said case unit.

8. The motion picture film shipping and handling unit defined in claim 7 wherein said case closing means further includes attaching means on said circumferential strap for releasably engaging said strap mounting means.

9. The motion picture film shipping and handling unit defined in claim 8 wherein said strap mounting means and said strap attaching means includes hook-and-loop fastener means.

10. The motion picture film shipping and handling unit defined in claim 1 wherein said case carrying handle unit further includes a handle locking means for attaching said handle unit to said case unit.

11. The motion picture film shipping and handling unit defined in claim 10 wherein said case carrying handle unit further includes an annular rim on the peripheral section of each hand-engaging element.

12. The motion picture film shipping and handling unit defined in claim 11 wherein each annular rim includes a plurality of ribs.

13. The motion picture film shipping and handling unit defined in claim 10 wherein said handle locking means includes a bore defined in said case unit, a bore defined through said central section, a locking pin extending through said hand-engaging element bore, a cam element on said locking pin for engaging said case unit adjacent to said case unit bore when said hand-engaging element locking means is locking said handengaging element to said case unit, a biasing element on said locking pin for urging said locking pin out of said hang-engaging element bore.

14. The motion picture film shipping and handling unit defined in claim 10 further including annular rib means on said case unit adjacent to said handle locking means, said rib means being grasped by a user when said case is carried by that user.

15. The motion picture film shipping and handling unit defined in claim 14 wherein said rib means includes an annular rim on said case inner surface and a U-shaped wall portion located within said case annular rim.

16. The motion picture film shipping and handling unit defined in claim 15 wherein said rib means further includes a portion thereof located adjacent to said case unit and defining therewith a slot, and further including a hub unit for supporting motion picture film, said hub unit having a flange portion thereof located within said slot.

17. The motion picture film shipping and handling unit defined in claim 1 further including a case locking means located in said case unit center area.

18. The motion picture film shipping and handling unit defined in claim 17 wherein said case locking means includes a central bore defined through said case unit, a case-locking pin extending through said central bore, a case-engaging head on one end of said case-locking pin and a locking element releasably mounted on another end of said case-locking pin.

19. The motion picture film shipping and handling unit defined in claim 18 wherein said case locking means further includes a bushing element interposed between said case locking pin and said case unit adjacent to said central bore.

20. The motion picture film shipping and handling unit defined in claim 18 wherein said case locking means further includes a closure plug mounted in said case central bore when said locking pin is removed form said central bore.

21. The motion picture film shipping and handling unit defined in claim 1 wherein said case unit includes two portions.

22. The motion picture film shipping and handling unit defined in claim 1 further including a film-supporting flange located inside said case unit.

23. The motion picture film shipping and handling unit defined in claim 22 further including a plurality of bumper elements on said film-supporting flange, said bumper elements being spaced from said motion picture film-engaging means.

24. The motion picture film shipping and handling unit defined in claim 22 further including a second film supporting flange located inside said case unit.

25. In combination:
(A) a motion picture film shipping and handling unit including two annular flanges, each flange having a central opening with an inner diameter, and na outer edge having an outer diameter, an annular locking ring having an outer surface with an outer diameter greater than the flange central opening inner diameter, a top surface, a bottom surface, an inner wall connecting said top surface to said bottom surface and having an outer diameter slightly less than said central opening inner diameter to snugly abut an annular flange adjacent to the central opening of that annular flange when said locking ring is in place in that central opening, said locking ring inner wall extending above said locking ring top surface and below said locking ring bottom surface, a film winding ring sized to surround said locking ring and to be spaced radially apart from said locking ring, a packing ring sized to be placed between said film winding ring and said locking ring, said packing ring being formed of flexible packing material, and means for attaching said locking ring to at least one of said annular flanges; and
(B) a case unit for containing a motion picture film and which includes an outer surface and an inner surface, a center area and an outer perimeter, a means on said case inner surface for holding motion picture film in said case, a plurality of indentations defined in said case outer surface along said outer perimeter, a case closing means on said outer perimeter, and a case carrying handle unit attached to said case at said case unit center section.

26. In combination:
(A) a motion picture film shipping and handling unit including a case unit for containing motion picture film and which includes an outer surface and an inner surface, a center area and an outer perimeter, a means on said case inner surface for holding motion picture film, a plurality of indentations defined in said case outer surface along said outer perimeter, a case closing means on said outer perimeter, and a case carrying handle unit attached to said case at said case unit center section; and
(B) a film supporting means accommodated in said case unit and which includes two annular flanges, each flange having a central opening with an inner diameter sized so said case inner wall slidably fits into said flange central opening, an outer edge with an outer diameter sized so said annular flange fits snugly against said case outer wall, an annular locking ring having an outer surface with an outer diameter greater than the flange central opening inner diameter, fastening means releasably connecting said locking ring to each of said flanges, a shipping ring mounted on said locking ring outer surface, an annular film winding ring which surrounds said locking ring, said film winding ring being resiliently biased towards said lockign ring and having an inner surface and an outer surface, said shipping means being located between said film winding ring inner surface an said lockign ring outer surface, said shipping means being movably associated with said lockign ring and said winding ring to move from a lockign position biasing said film winding ring radially outward away form said locking ring outer surface to an unlocking position permitting said film winding ring to move towards said locking ring outer surface, hub means for attaching said film supporting means to a spindle and attaching said film supporting means to a reel-type movie projection system, said hub means including a center hub element located adjacent to said annular locking ring central opening and having means for releasably mounting said center hub element to the spindle, and fastening means releasably mounting said center hub element to said film supporting means.

* * * * *